United States Patent [19]

Virkar

[11] Patent Number: 5,006,494

[45] Date of Patent: Apr. 9, 1991

[54] STABILIZED BISMUTH OXIDE

[75] Inventor: Anil V. Virkar, Salt Lake City, Utah

[73] Assignee: Gas Research Institute, Chicago, Ill.

[21] Appl. No.: 342,291

[22] Filed: Apr. 24, 1989

[51] Int. Cl.$^5$ .................. C04B 35/48; C04B 35/50
[52] U.S. Cl. .................. 501/152; 204/421; 429/193; 501/103; 501/126
[58] Field of Search .................. 501/126, 152, 103; 204/421; 429/193

[56] References Cited

U.S. PATENT DOCUMENTS

| 4,279,974 | 7/1981 | Nishio | 429/193 |
|---|---|---|---|
| 4,330,633 | 5/1982 | Yoshisato et al. | 501/152 |
| 4,412,895 | 11/1983 | Lu | 204/129 |
| 4,421,781 | 12/1983 | Ikezawa et al. | 204/421 |
| 4,449,919 | 5/1984 | Takikawa et al. | 204/421 |
| 4,559,126 | 12/1985 | Mase et al. | 204/426 |
| 4,579,643 | 4/1986 | Mase et al. | 204/426 |
| 4,610,741 | 9/1986 | Mase et al. | 204/426 |
| 4,647,364 | 3/1987 | Mase et al. | 204/426 |
| 4,655,892 | 4/1987 | Satta et al. | 204/421 |
| 4,657,659 | 4/1987 | Mase et al. | 204/426 |
| 4,659,448 | 4/1987 | Gordon | 204/427 |
| 4,670,128 | 6/1987 | Mase et al. | 204/426 |
| 4,728,411 | 3/1988 | Mase et al. | 204/426 |
| 4,755,274 | 7/1988 | Mase et al. | 204/426 |
| 4,770,761 | 7/1988 | Burggraaf et al. | 204/421 |
| 4,798,693 | 1/1989 | Mase et al. | 204/426 |

*Primary Examiner*—Mark L. Bell
*Attorney, Agent, or Firm*—Trask, Britt & Rossa

[57] ABSTRACT

Disclosed is a stable bismuth oxide composition having excellent oxygen ion conductivity comprising: from 50 to 90 mole % $Bi_2O_3$, from 10 to 40 mole % of a rare earth oxide, such as yttria; and from 0.1 to 10 mole % g an oxide compound, such as $ZrO_2$ or $ThO_2$. The composition retains its oxygen ion transport capabilities even after prolonged annealing.

10 Claims, 9 Drawing Sheets

STABILIZED BISMUTH OXIDE

BACKGROUND OF THE INVENTION

1. Field

This invention relates to ceramics generally and to stable bismuth oxide ceramics specifically.

2. State of the Art

Ceramic electrolytes, such as zirconia, have been used in automotive sensors and other applications wherein the oxygen ion transport capabilities of ceramic electrolytes have been utilized. Cubic bismuth oxide ($Bi_2O_3$) is much more effective than zirconia as a conductor of oxygen ions. However, bismuth oxide tends to be unstable and its conductive characteristics are not retained over longer periods of time (e.g. 50 percent diminution over 100 hours) and also its strength tends to diminish. A tendency exists for the cubic phase of bismuth oxide to convert to monoclinic at temperatures below about 73° centigrade (C).

Some work in the area of stabilization of bismuth oxide has occurred. Similar to stabilization of zirconia, yttria has also been used with some enhancement of stability in bismuth oxide. However, even yttria-bismuth oxide compositions do not have the long-term stability required to be an effective electrolyte for sensors and other oxygen transport devices in industry.

Bismuth oxide is known to exhibit two polymorphs; namely, cubic above 730° and monoclinic below 730° C. The cubic phase, which is stable between about 730° C. and the melting point $Bi_2O_3$ of 825° C. is of the $CaF_2$ type. Its chemical formula suggests that in order to crystallize in the $CaF_2$-type structure, there must be 25 mole % anion vacancies in the structure. The very high concentration of oxygen vacancies is believed to be the primary reason for the exceptional ionic conductivity of $Bi_2O_3$ in the cubic form. However, pure $Bi_2O_3$ cannot be thermally cycled through the transformation temperature since the volume change associated with the cubic to monoclinic transformation leads to disintegration of the material. It has, however, been shown that numerous rare earth and alkaline earth oxides can be added to lower the transformation temperature and thus enhance the stability range of the cubic phase. The published phase diagrams indicate that in most cases the oxide additive extends the stability range of the $Bi_2O_3$-oxide solid solution, which decomposes eutectoidally below about 700° C. In the case of yttria ($Y_2O_3$) as the additive, the work of Datta and Meehan shows that the cubic phase can be stabilized to temperatures at least as low as 500° C. and possibly lower.

It has also been documented that oxygen ion conductivity of yttria-stabilized bismuth oxide is at least two orders of magnitude higher than that of stabilized zirconia. Thus, it would appear that yttria-stabilized $Bi_2O_3$ would be an ideal candidate as a solid electrolyte in devices which require high ionic conductivity at moderate temperatures. Recent work has shown, however, that long-term annealing treatment at approximately 600° C. leads to the decomposition of $Y_2O_3$-$Bi_2O_3$ solid solutions suggesting that the phase diagram given by Datta and Meehan is incorrect. It is to be noted that Datta and Meehan, who used materials of very high purity (typically in excess of 99.99% or greater), experienced difficulty in achieving equilibrium in several of the compositions examined in their work. The significance of the purity of the starting materials will be discussed later.

Stability of the solid electrolyte is the principal requirement of any realistic device based on $Bi_2O_3$. Thus, it is imperative that the solid electrolyte remain stable over the design life of the device. If this cannot be guaranteed, $Bi_2O_3$-based solid electrolytes will be of little practical value. The fact that it is possible to retain $Bi_2O_3$ stabilized by $Y_2O_3$ and other rare earth oxides at lower temperatures long enough to make conductivity measurements suggests that the decomposition upon annealing must somehow depend on the kinetics of mass transport. If so, the factors which suppress the kinetics of mass transport are expected to slow down the kinetics of mass transport are expected to slow down the kinetics of destabilization. Assuming that the products of the decomposition are formed by a diffusional process, it would appear that factors which suppress the pertinent diffusion coefficient would impart kinetic stability. Conversely, factors which enhance the diffusion coefficient would lead to rapid deterioration of the solid electrolyte.

SUMMARY OF THE INVENTION

It has recently been discovered that the inclusion of a finer amount of zirconia or hafnia in a yttria-bismuth oxide ceramic body greatly enhances the stability of the bismuth oxide, enabling it to remain in the cubic phase over very long periods of time.

Typical bismuth oxide-yttria compositions are 75% bismuth oxide and 25% yttria. Inclusion of zirconia, hafnia, or thoria in amounts up to about 10 mole % enhances the stability of the cubic phase of bismuth oxide by several orders of magnitude.

Stable bismuth oxide ceramic compositions according to the present invention include (a) bismuth oxide substantially (i.e. >60%) present in the cubic phase as the predominant component; (b) a rare earth oxide present in a quantity of about 10 to about 40 mole percent; and (c) an oxide compound having a cationic element with a valence of four or more present in quantities of about 0.1 to about 10 mole percent. Such a ceramic composition, present substantially as a high-temperature phase, has excellent oxygen ionic conductivity even after days of use at high temperatures.

In its broader aspect the invention involves the stabilization of bismuth oxide by inclusion of a rare earth oxide such as oxides of yttrium, ytterbium, neodymium, gadolinium, samarium, lanthanum, terbium, erbium, and the like by the incorporation of an oxide of a cation having a valence of four or greater, such as zirconia, hafnia, thoria, titania, stannic oxide, tantalum oxide, and niobium oxide. The rare earth oxide may be included in amounts up to about 40 mole % while the polyvalent cationic oxide may be included in amounts up to about 10% mole. Generally amounts as small as about 0.5 and particularly at levels of about 2.0 to 5.0 mole % as minimum quantities have been found very effective.

BRIEF DESCRIPTION OF THE FIGURES

FIG. 3(A) at 2%

CaO; FIG. 3(B) at 1% CaO; FIG. 3(C) undoped; FIG. 3(D) at 2% $ZrO_2$; FIG. 3(E) at 2% $ThO_2$.

FIG. 4 shows the optical microphotographs of the undoped samples annealed at 600° for various times; 4(A) at 0 hrs.

DETAILED DESCRIPTION OF THE PREFERRED EMBODIMENTS

The compositions of the present invention are believed to suppress cation transport and thereby enhance the kinetic stability of $Y_2O_3$—$Bi_2O_3$ solid solutions. Since diffusion of Y and Bi on the cation sublattice is expected to occur by the movement of point defects, namely vacancies and interstitials, the defect mobilities and defect concentrations are expected to determine the interdiffusion coefficient. For example, if the interstitial mobility is lower than the vacancy mobility, enhancement of the interstitial concentration (to a point) at the expense of the vacancy concentration should lead to lower the interdiffusion coefficient. The opposite would be the case if the interstitial mobility is greater than the vacancy mobility.

Incorporation of a dopant of a valence different than that of the host ion seems to alter the defect concentration. For example, a tetravalent cationic dopant (e.g. Zr or Th) should enhance cation vacancy concentration while a divalent cationic dopant (Ca) should enhance interstitial concentration.

Bismuth oxide for use in the present invention will typically have a substantially quantity (>90%) of the cubic (high temperature) phase, and a very small quantity of the rhombohedral (low temperature) phase. Bismuth oxide also has a rhombohedral high temperature phase which may be used in place of the cubic high temperature phase. Such bismuth oxide is readily available from many commercial vendors such as Alfa Chemicals. The bismuth oxide will be present in amounts from about 50 to about 90 mole %, with a preferred amount being about 75 mole percent.

Dopants useful in the present invention will generally be present in the ceramic composition in an amount not exceeding about 10 mole percent. Dopants for use in the invention will typically have a cationic portion wherein the cation will have a valence of 4+ or more. Examples of useful dopants include oxides of zirconium, titanium, thorium, hafnium, tantalum, niobium, tungsten, molybdenum, and vanadium. These dopants will preferably be present in an amount of 2 mole %.

Stabilizers for use in the invention are typically rare earth oxides present in an amount of about 10 to about 40 mole percent. Oxides of the entire lanthanide series are believed to work in this invention, although the preferred rare earth oxide is yttria.

EXAMPLES

In the present work, baseline material containing 25 mole % $Y_2O_3$ and 75 mole % $Bi_2O_3$ with CaO, $ZrO_2$ and $ThO_2$ as dopants were annealed at 600° C. and 650° C. for up to several days. The samples were subsequently characterized using X-ray diffraction, optical microscopy and electron microprobe analysis. The experimental procedure, results and a discussion of the results are presented in the following.

EXPERIMENTAL PROCEDURE (a): Fabrication of Samples $Y_2O_3$ and $Bi_2O_3$ from readily available commercial sources were used for the present work. $CaCO_3$ was used as the source of CaO while zirconia ($ZrO_2$) and $ThO_2$ powders were used directly as dopants. Chemical analyses of the as-received powders, supplied by the vendors, are given in Table I.

TABLE I

| Material | Chemical Analysis of the as-received Powders Impurities (concentration) | | | | | | |
|---|---|---|---|---|---|---|---|
| $Bi_2O_3$ | Fe 20 ppm | Mg 8 ppm | | | | | |
| $Y_2O_3$ | La 75 ppm | Nd 50 ppm | Gd 15 ppm | Zr 20 ppm | Na 15 ppm | Ca 6 ppm | Fe 5 ppm |

$Y_2O_3$ and $Bi_2O_3$ powders were mixed in the molar ratio of 1:3. The powder mixtures were milled using either zirconia or alumina milling media. The dopants were added to the baseline mixture. The maximum amount of CaO added as 2 mole % while that of $ZrO_2$ and $ThO_2$ was 10 mole %. Much of the work reported here is on CaO-doped, undoped and $ZrO_2$ doped (up to 2 mole %) samples. The powders were wet milled in acetone. The powder mixtures were subsequently dried in an oven and pellets were green-formed by die-pressing followed by isostatic pressing. The samples were then sintered in air at 1000° C. for 24 hours. The as-sintered samples were examined using X-ray diffraction with $CuK\alpha$ radiation. The density of the samples was determined by the conventional fluid immersion technique.

(b): Thermal Treatments:

The as-sintered samples were annealed in air 600° C. and 650° C. for up to several days. The samples were periodically removed from the furnace, characterized and reinserted into the furnace for further annealing.

(c): X-ray Diffraction:

After annealing, the samples were ground and then examined by X-ray diffraction. X-ray diffraction traces were obtained using $CuK_\alpha$ radiation. The objectives was to determine the phases present, their structures & the respective lattice parameters and estimate the extent of phase transformation on the basis of integrated peak intensities. The integrated peak intensities were determined using the peak of the $CaF_2$ structure and the (on the hexagonal basis) peak of the rhombohedral phase which formed upon annealing in the undoped and CaO-doped samples.

(d): Optical Microscopy and Chemical Analysis:

Samples were polished and thermally etched at 900° C. for 60 minutes in order to reveal the grain structure. For the samples that had undergone phase transformation, no thermal etching was done so as to prevent reconversion of the transformed phase(s) into the original cubic phase. The relative difference between the hardnesses of the two phases led to relief polishing which was adequate to distinguish the morphology of the phase(s). Chemical analysis was conducted on Cameca SX50 electron microprobe. The objective was to determine the compositions of the original solid solutions as well as the decomposed samples.

RESULTS

Figure 1:
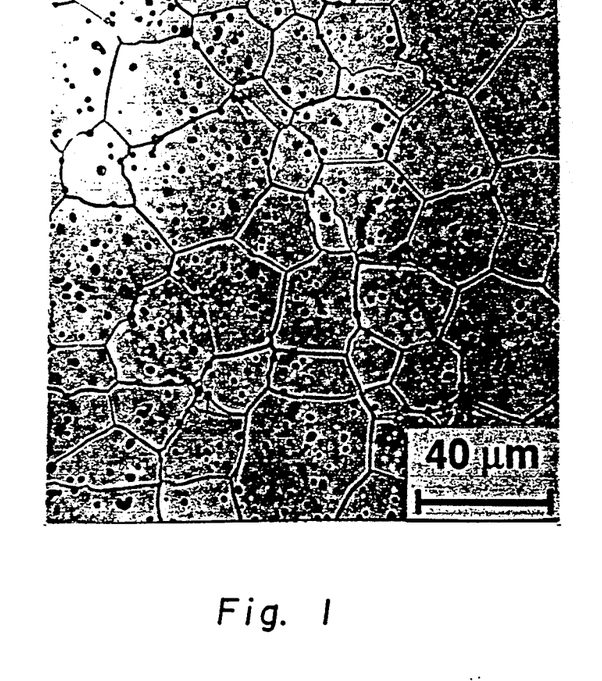
FIG. 1 is an optical microphotograph of the as-sintered sample of III(a)
Figure 2:
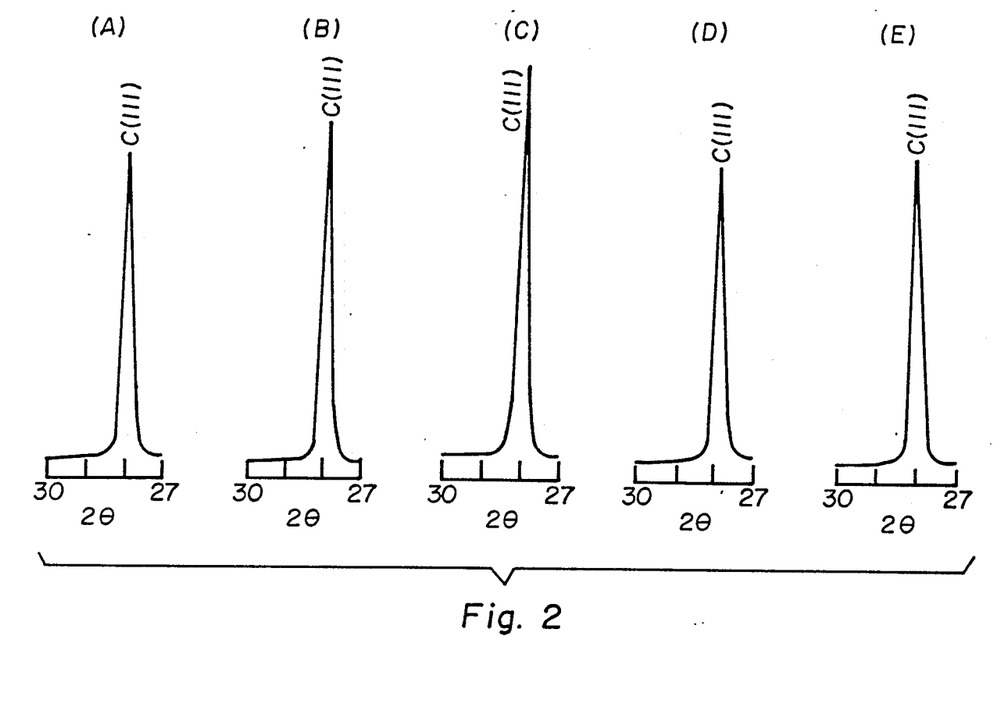
FIG. 2 is the X-ray diffraction peaks of the as-sintered samples of $Y_2O_3$-$Bi_2O_3$ with CaO, $ZrO_2$ and $ThO_2$ as dopants as well as undoped samples.
Figure 3:
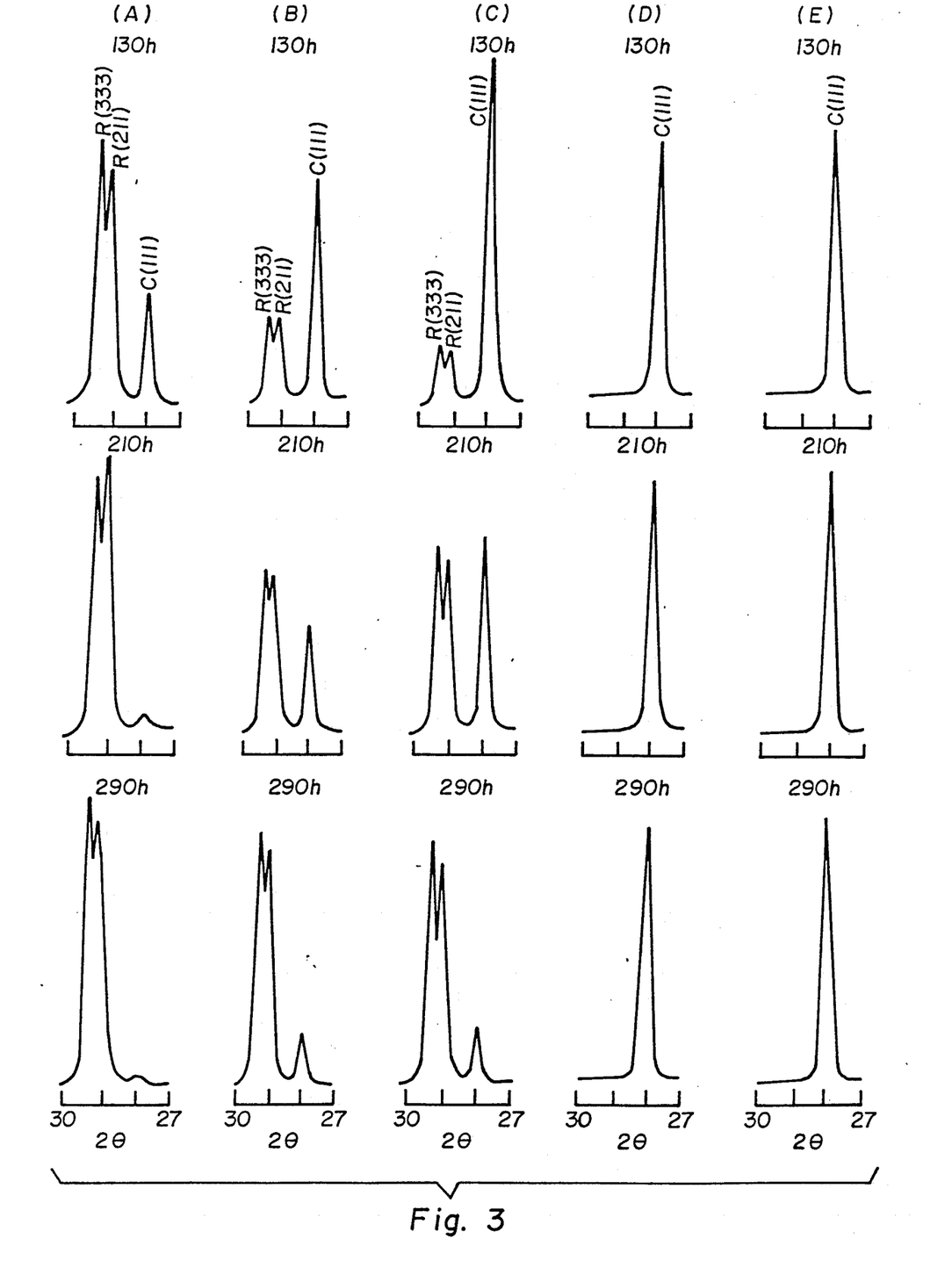
FIG. 3 is the X-ray diffraction traces of doped and undoped samples after annealing.
Figure 4A:
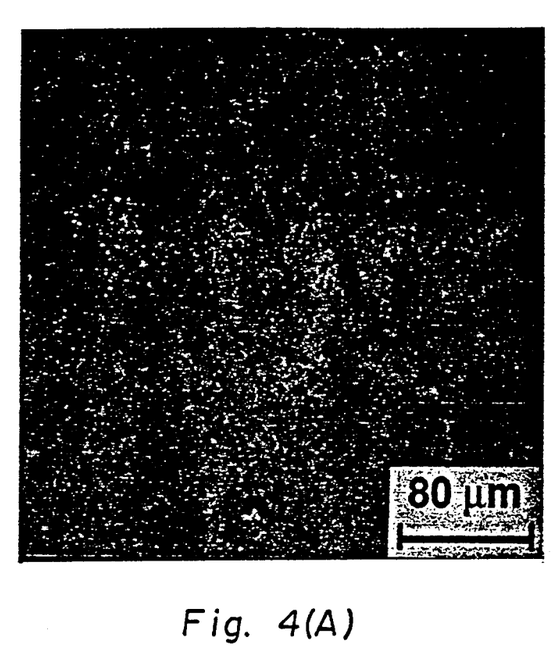
Figure 4B:
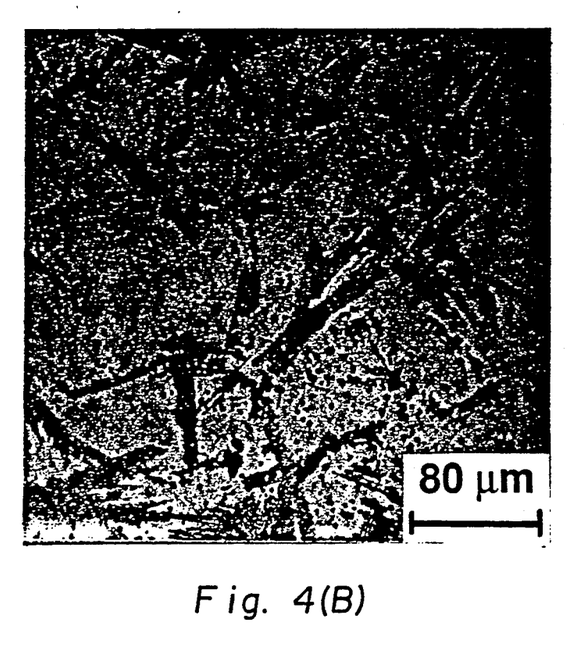
FIG. 4(B) at 170 hrs.
Figure 4C:
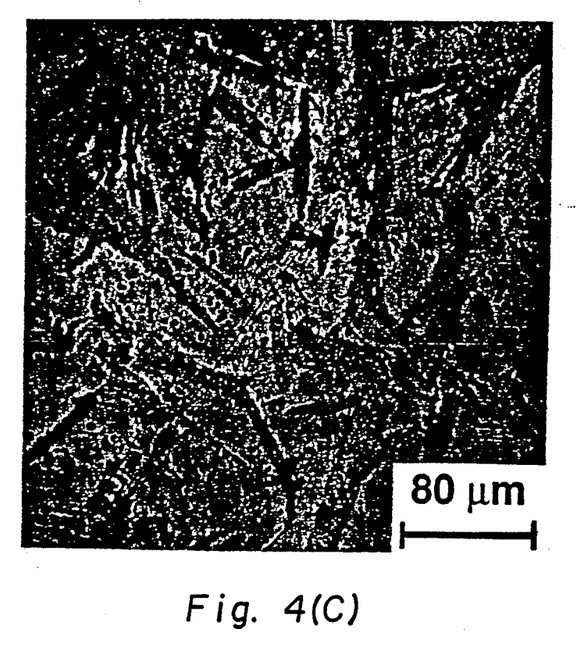
FIG. 4(C) at 210 hrs.
Figure 4D:
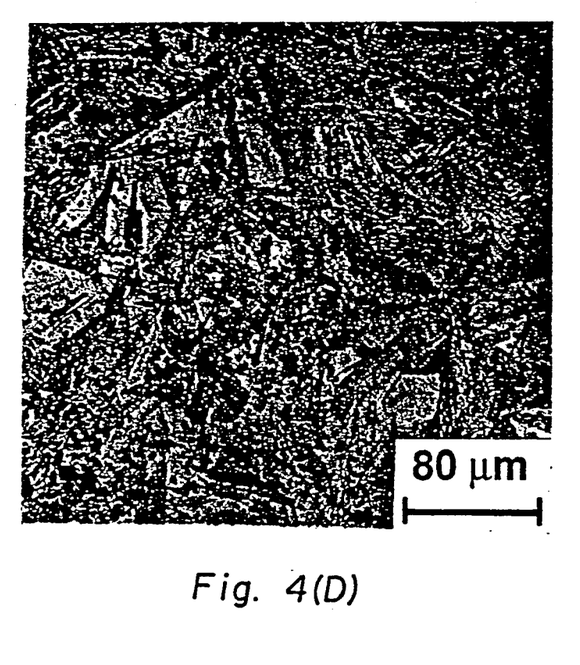
FIG. 4(D) at 250 hrs.
Figure 4E:
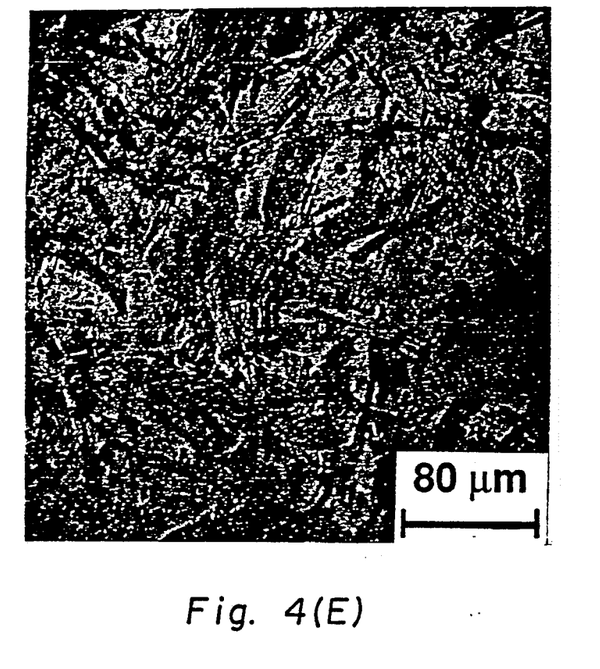
FIG. 4(E) at 290 hrs.

III(a): As-Sintered Samples:

The as-sintered, undoped samples typically had a density in excess of 7.85 g/ml. Samples doped with $ZrO_2$ were lower in density with density decreasing with increasing $ZrO_2$ content. Samples containing 2 mole % and 10 mole % $ZrO_2$ had densities of 7.67 and 7.33 gms/ml. CaO-doped samples also exhibited somewhat lower density which was attributed to the residual $CaCO_3$ that may have been present after the densification had begun. The as-sintered samples were orange in color. An optical photomicrograph of the as-sintered sample is shown in FIG. 1. The same was thermally etched at 900° C. for 60 minutes. Typical grain size of the as-sintered samples was about 23 μm. As seen in the micrograph, the porosity can be seen within the grains as well as at the grain boundaries. X-ray diffraction of the as-sintered samples with and without any dopants indicated that all of them were single phase with $CaF_2$ as the only crystal type present. FIG. 2 shows X-ray diffraction peaks of the as-sintered samples of the following compositions: 2(a)—2 mole % CaO, 2(b)—1 mole % CaO, 2(c)—undoped, 2(d)—2 mole % $ZrO_2$, and 2(e)—2 mole % $ThO_2$. As seen in the diffraction traces, the as-sintered samples are all single phase cubic with $CaF_2$ structure. Full scans over angle range between 20° and 60° showed that the dopants were dissolved in the material. For $ZrO_2$ concentration beyond 7.5 mole %, additional peaks corresponding to the dopant were observed suggesting that the dopant solubility is lower than 7.5 mole %. Within the accuracy of the measurements, the lattice parameters were found to be independent of the dopant type and concentration. Table II gives the measured lattice parameters as a function of the dopant type and concentration.

III(b): Thermal Treatments:

FIGS. 3(a), 3(b), 3(c), 3(d), and 3(e) show X-ray diffraction traces respectively of 2 mole % CaO-doped, 1 mole % CaO-doped, undoped, 2 mole % $ZrO_2$-doped, and 2 mole % $ThO_2$-doped samples annealed at 600° C. for various periods of time. As shown in the FIG., the undoped and CaO-doped samples contain two phases, namely cubic and rhombohedral. However, the $ZrO_2$- and $ThO_2$-doped samples remained single phase cubic. In the undoped and CaO-doped samples, within the limits of the X-ray analysis, no peaks corresponding to phases other than the cubic and rhombohedral phases were observed. As seen in these figures, the extent of phase transformation is the greatest in the CaO-doped samples with no phase transformation occurring in the $ZrO_2$— and $ThO_2$-doped samples. FIGS. #4(a), #4(b), #4(c), #4(d), and #4(e) show optical micrographs of the undoped samples annealed at 600° C. for 0, 170, 210, 250, and 290 hours, respectively. The plate-shaped particles are of rhombohedral phase. As seen in the micrographs, the volume fraction of the rhombohedral phase increases with increasing annealing time.

TABLE II

Lattice parameters of the cubic phase of undoped, $ZrO_2$-doped and CaO-doped samples

| 7.5 mole % $ZrO_2$ | Lattice parameter (A) |
| --- | --- |
| 7.5 mole % $ZrO_2$ | 5.4975 |
| 5 mole % $ZrO_2$ | 5.5059 |

TABLE II-continued

Lattice parameters of the cubic phase of undoped, $ZrO_2$-doped and CaO-doped samples

| 7.5 mole % $ZrO_2$ | Lattice parameter (A) |
| --- | --- |
| 3 mole % $ZrO_2$ | 5.5053 |
| 2 mole % $ZrO_2$ | 5.5087 |
| Undoped | 5.5075 |
| 1 mole % CaO | 5.5130 |
| 2 mole % CaO | 5.5123 |

Figure 5A:
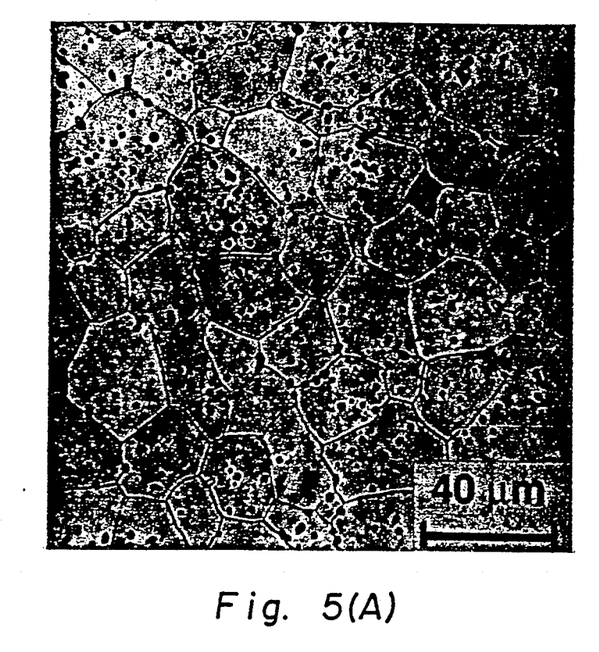
FIG. 5 shows the microstructures of the as-sintered and annealed samples doped with 5.0 mole % $ZrO_2$.
Figure 5B:
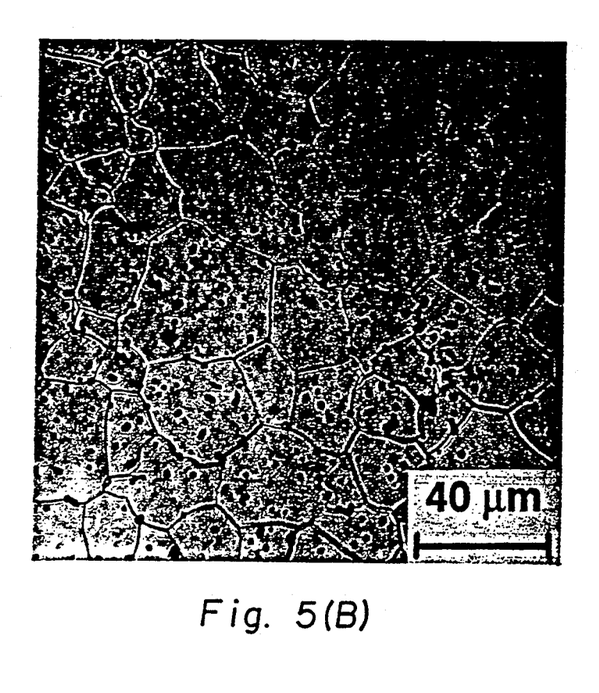

In the subsequent work, undoped, 1.0 mole % CaO-doped and $ZrO_2$-doped samples with 2.0, 3.0, 5.0, 7.5 and 10.0 mol % $ZrO_2$ were annealed at 600° C. for up to 1020 hours. After annealing, the samples were ground and polished, examined by X-diffraction, thermally etched (only the $ZrO_2$-doped), and examined under an optical microscope. It was observed that all of the $ZrO_2$-doped samples remained cubic. The grain size of the samples was also unaltered after the thermal treatment. Microstructures of the as-sintered and annealed samples doped with 5.0 mole % $ZrO_2$ are shown in FIGS. 5(a) and 5(b), respectively. By contrast, the undoped samples and samples doped with 1.0 and 2.0 mole % CaO exhibited a substantial amount of transformation within the first 100 hours. In samples doped with 2.0 mole % CaO, the transformation was nearly complete in about 200 hours. Again, within the limits of the accuracy of X-ray analysis, no peaks corresponding to any other phases were observed. Fraction transformed, X(t), determined using integrated peak intensities from X-ray diffraction traces is plotted vs. ln(t) in FIG. 6. The powder mixtures of the samples used in this study were milled using alumina grinding media. Similar experiments done using samples made from powders milled with zirconia media showed that the kinetics of phase transformation were slower. The significance of this will be discussed later.

Figure 6:
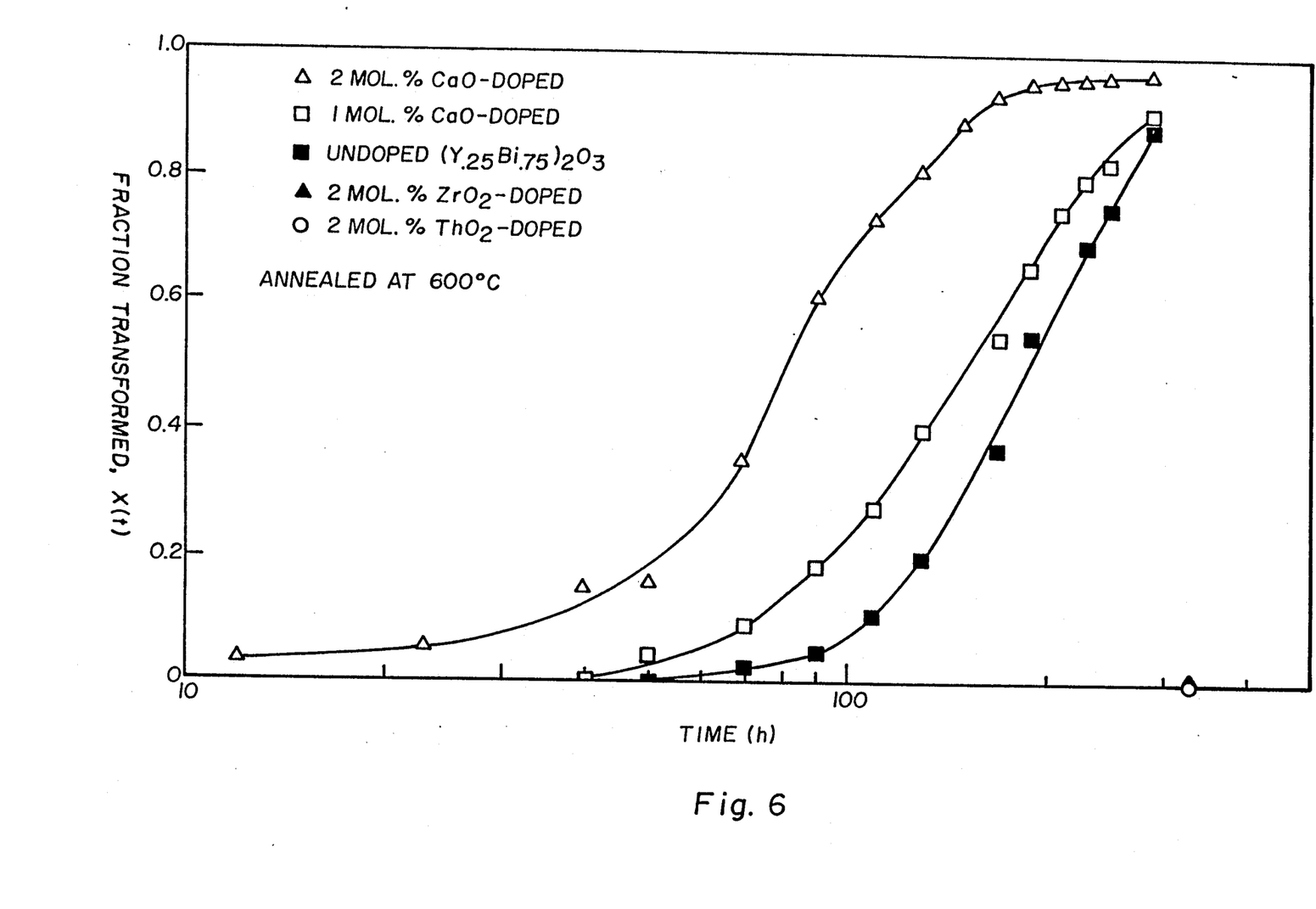
FIG. 6 plots the fraction transformed $X(+)$, determined using integrated peak intensities from X-ray diffraction traces v. $\ln(t)$.

FIG. 6 suggests that the fraction transformed may be described by an Avrami equation as follows:

$$X(t) = 1 - exp[-(-)]^m \tag{1}$$

Figure 7:
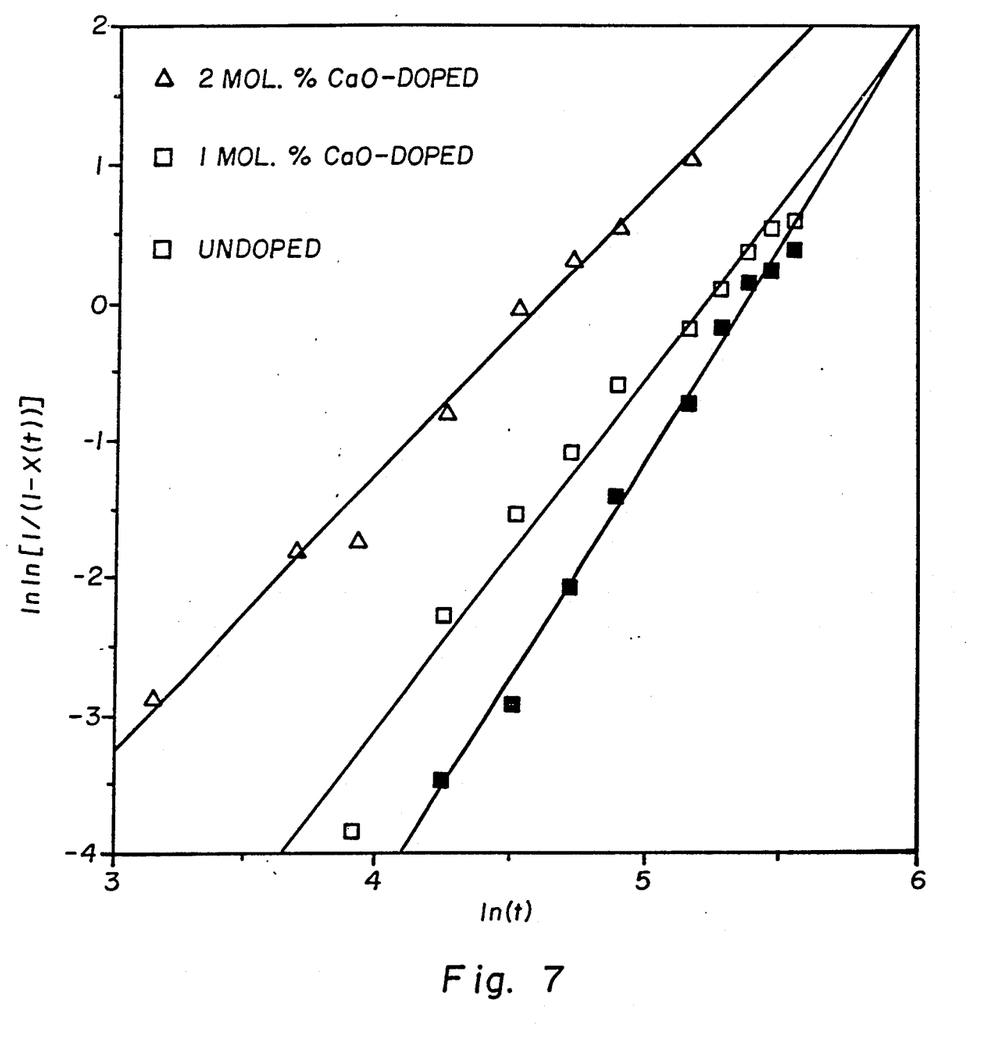
FIG. 7 replots the fraction transformed in FIG. 6 as a function of annealing time.

In the preceding equation, is the pertinent relaxation time. The fraction transformed shown in FIG. 6 is τ replotted as a function of annealing time as ln ln (1/(1−X(t))]vs. ln(5) in FIG. 7. The parameters m and −min (τ) are identified with the slope and intercept respectively in FIG. 7. The experimentally determined values of m are between ~2 for samples doped with 2 mole % CaO to 3.2 for undoped samples. The relaxation times, τ, for the undoped, 1 mole % CaO-doped and 2 mole % CaO-doped were determined to be ~211, ~182 and ~101 hours, respectively.

III.(c): Chemical Analysis:

Chemical analysis of the undoped, as-sintered samples, conducted using Cameco SX50 electron microprobe, showed that the $Y_2O_3$ and the $Bi_2O_3$ concentrations were respectively 23.3 mole % and 76.7 mole %. The as-sintered samples were single phase cubic as mentioned earlier. The undoped samples, after annealing at 600° C. for 170 hours, were also chemically analyzed. The samples were two phased, containing both the cubic and the rhombohedral phases. The concentrations of $Y_2O_3$ and $Bi_2O_3$ in the cubic and the rhombohedral phases were determined to be 23.53 mole % $Y_2O_3$, 76.45 mole % $Bi_2O_3$ and 23.03 mole % $Y_2O_3$, 76.97 mole % $Bi_2O_3$, respectively. Within the limits of the experimental accuracy (1% of the absolute value), the compositions of the two phases appear to be nearly identical. In the samples annealed for 210 hours, which contained greater amount of the rhombohedral phase, the compositions of the cubic and the rhombohedral phases were determined to be 23.64 mole % $Y_2O_3$, 76.36 mole % $Bi_2O_3$ and 23.1 mole % $Y_2O_3$, 76.9 mole % $Bi_2O_3$, respectively. This suggests that the transformation from the cubic to the rhombohedral phase must be a composition invariant transformation.

DISCUSSION

While not intending to be bound by one theory of the invention, the following may help to explain the extraordinary results obtained herein. The transport of oxygen is not necessary for the occurrence of phase transformation (although not precluded from occurring) since it is common to both end members in the same stoichiometry. Thus, the factors which increase or decrease the interdiffusion coefficient on the cation sublattice enhance or suppress the phase transformation kinetics respectively. The interdiffusion coefficient, $D$, on the cation sublattice is given by $$D = \frac{D_Y D_{Bi}}{X_Y D_Y + X_{Bi} D_{Bi}} \quad (2)$$

where $X_Y$ and $X_{Bi}$ are the mole fractions of and $D_y$ and $D^{Bi}$ are the diffusion coefficients of Y and Bi, respectively. The cation diffusion is expected to occur via point defects, e.g. vacancies and interstitials. Thus, both $D_Y$ and $D_{Bi}$ are expected to depend upon the concentration of cation vacancies and interstitials and on vacancy and interstitial mobilities. If the vacancy concentration far exceeds the concentration of interstitials, the interdiffusion coefficient varies linearly with the vacancy concentration. Alternatively, if the interstitial concentration far exceeds the vacancy concentration, the interdiffusion coefficient will vary linearly with the interstitial concentration. For a "pure" system, i.e. "intrinsic" system, the vacancy and the interstitial concentrations will be the same and equal to $\sqrt{K_F}$ where $K_F$ is the Frenkel product on the cation sublattice. Now, in general the vacancy and the interstitial mobilities will be different. If the vacancy mobility is greater/lower than the interstitial mobility, an increase in the vacancy concentration for the intrinsic value will lead to the enhancement/suppression of the interdiffusion coefficient. Alternatively, a decrease in the vacancy concentration will suppress/enhance the interdiffusion coefficient. The net effect is that at some unique concentrations of the point defects the interdiffusion coefficient will exhibit a minimum. Indeed a minimum in cation diffusion has been observed by Petuskey and Dieckmann and coworkers in iron aluminate spinel and magnetite, respectively. In these works, the pertinent defect concentrations were altered by varying the partial pressure of oxygen. Attainment of a minimum in the interdiffusion coefficient is consistent with minimizing the kinetics of processes which are controlled by the interdiffusion coefficient.

Deviation of defect concentrations from the intrinsic values can be effected by either changing the partial pressures of the constituents of by the incorporation of aliovalent dopants, the latter approach probably being the more convenient one for the present work. Addition of $ZrO_2$ or $ThO_2$ as dopants is expected to enhance the cation vacancy concentration above the intrinsic value. A plausible reaction may be given by $$\frac{3}{2} ZrO_2 \rightarrow \frac{3}{2} Zr \cdot Bi, Y + 3O^{xO} + V''_{Bi,Y} \quad (3)$$

A similar equation can be written for $ThO_2$ dopant. The preceding equation shows that incorporation of a tetravalent cation leads to an enhancement in the cation vacancy concentration. Concurrently, the interstitial concentration will be suppressed through the Frenkel product. Addition of $ZrO_2$ or $ThO_2$ can also lead to an increase in the oxygen interstitial concentration. In principle, both of the defect reactions are correct and thus both, the cation vacancy concentration and the oxygen interstitial concentration, will increase. A change in the defect concentration on the anion sublattice, however, is not expected to affect the kinetics of phase separation and will not be discussed further. It should be mentioned, however, that the relationship between the cation vacancy concentration and the dopant concentration would depend upon the pertinent electroneutrality condition which in turn will depend upon the majority defects. In such a case, the knowledge of anion defect concentration may be necessary for determination of the relationship between the dopant concentration and the cationic point defects.

Incorporation of a cationic dopant of a valence less than 3 should enhance the cation interstitial and oxygen vacancy concentrations. Again, oxygen defect concentration is not relevant as far as this discussion is concerned. Dissolution of CaO may occur by the following reactions:

$$3 \, CaO \rightarrow 3 \, Ca_{Bi,y} + 3O^x_O + I_{Bi,Y} \quad (4)$$

where "I" denotes an interstitial.

The preceding discussion suggests that $ZrO_2$ and CaO as dopants are expected to affect the interdiffusion coefficient, $D$, in opposite ways. Indeed, it was observed that the kinetics of phase transformation were enhanced by CaO and were suppressed by $ZrO_2$. The effect observed is so profound that the addition of 2 mole % $ZrO_2$ stabilizes the cubic phase at 600° C. for at least 1020 hours, the maximum duration of time that the samples were annealed. By contrast, phase transformation was essentially 100% complete in ~290 hours in samples doped with 2 mol % CaO. These results indicate that the cation vacancy mobility is lower than the cation interstitial mobility in $Bi_2O_3$—$Y_2O_3$ solid solutions. The fact that the samples milled with zirconia media exhibited slower kinetics is in accord with expectations since some amount of media wear must have occurred thereby inadvertently doping the samples with zirconia. The present work also shows that $Bi_2O_3$—$Y_2O_3$ cubic solid solutions can be kinetically stabilized.

Although the invention has been described with a certain degree of particularity in both composition and theory, it is understood that the present disclosure has been made only by way of example and that numerous changes in details of composition may be resorted to without departing from the scope of the following claims.

I claim:

1. A stable $Bi_2O_3$ ceramic composition having excellent oxygen ion conductivity consisting essentially of: $Bi_2O_3$ in amounts from about 50 to about 90 mole %;

$Y_2O_3$ in amounts from about 10 to about 40 mole %; and a dopant selected from the group consisting of $ZrO_2$, thoria or $HfO_2$ in amounts from about 0.1 to about 10 mole %.

2. The ceramic composition of claim 1 wherein said dopant is present in amounts of at least about 2 mole %.

3. The ceramic composition of claim 1 wherein said dopant is present in an amount not greater than about 5 mole %.

4. The ceramic composition of claim 1 wherein said $Bi_2O_3$ and $Y_2O_3$ are present in a molar ratio of about 3:1.

5. The ceramic composition of claim 1 wherein said dopant is $ZrO_2$.

6. The ceramic composition of claim 1 wherein said dopant is thoria.

7. The ceramic of claim 4 wherein said dopant is $ZrO_2$.

8. The ceramic composition of claim 4 wherein said dopant is thoria.

9. The ceramic composition of claim 4 wherein said dopant is present from about 2 to about 5 mole %.

10. The ceramic composition of claim 9 wherein said dopant is $ZrO_2$.

* * * * *